US012235812B2

(12) United States Patent
Ee et al.

(10) Patent No.: US 12,235,812 B2
(45) Date of Patent: Feb. 25, 2025

(54) METHOD AND SYSTEM FOR RECURSIVE DATA REFINEMENT AND REPUBLISHING

(71) Applicant: JPMorgan Chase Bank, N.A., New York, NY (US)

(72) Inventors: Wooyong Ee, Frisco, TX (US); Jooi-Teong Chuah, East Brunswick, NJ (US); Samip Chakraborty, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 7 days.

(21) Appl. No.: 17/804,231

(22) Filed: May 26, 2022

(65) Prior Publication Data

US 2022/0382725 A1      Dec. 1, 2022

Related U.S. Application Data

(60) Provisional application No. 63/203,208, filed on Jul. 13, 2021.

(30) Foreign Application Priority Data

May 29, 2021   (IN) .............................. 202111024031

(51) Int. Cl.
  *G06F 16/21*     (2019.01)
  *G06F 16/215*    (2019.01)
(52) U.S. Cl.
  CPC .......... *G06F 16/215* (2019.01); *G06F 16/219* (2019.01)

(58) Field of Classification Search
  CPC ...... G06F 16/215; G06F 16/219; G06F 16/93; G06N 20/00
  USPC ......................................................... 707/705
  See application file for complete search history.

(56) References Cited

U.S. PATENT DOCUMENTS

| | | | |
|---|---|---|---|
| 10,673,880 B1 * | 6/2020 | Pratt | H04L 63/1425 |
| 10,733,514 B1 * | 8/2020 | Savir | G06F 11/3476 |
| 2016/0092557 A1 * | 3/2016 | Stojanovic | G06F 16/248 707/723 |
| 2018/0219897 A1 * | 8/2018 | Muddu | G06F 16/285 |
| 2018/0285418 A1 * | 10/2018 | Petropoulos | G06F 16/3332 |
| 2019/0102438 A1 * | 4/2019 | Murray | G06F 40/109 |
| 2019/0279281 A1 * | 9/2019 | Kumar | G06Q 30/0631 |
| 2019/0340518 A1 * | 11/2019 | Merrill | G06F 40/56 |
| 2020/0026710 A1 * | 1/2020 | Przada | G06F 16/254 |
| 2020/0067789 A1 * | 2/2020 | Khuti | H04L 41/5009 |
| 2020/0294642 A1 * | 9/2020 | Bostic | G16H 50/20 |
| 2020/0394455 A1 * | 12/2020 | Lee | G06F 18/213 |
| 2021/0103865 A1 * | 4/2021 | Anisingaraju | G06F 16/367 |
| 2021/0295822 A1 * | 9/2021 | Tomkins | G06F 9/547 |
| 2021/0374143 A1 * | 12/2021 | Neill | G06F 16/24568 |

(Continued)

*Primary Examiner* — Hicham Skhoun
(74) *Attorney, Agent, or Firm* — GREENBLUM & BERNSTEIN, P.L.C.

(57) ABSTRACT

A method for facilitating recursive data refinement with self-documentation is provided. The method includes receiving, via a data ingestion component, raw data that is published from a networked repository; generating a conformed data set from the raw data based on a conformation parameter; retrieving, via a communication interface, a feature configuration; generating, in real-time, a featurized data set from the conformed data set based on the feature configuration; and publishing the featurized data set to the data ingestion component for further processing.

18 Claims, 7 Drawing Sheets

(56) References Cited

U.S. PATENT DOCUMENTS

2022/0277227 A1* 9/2022 Yu ............................ G06Q 30/01
2022/0329328 A1* 10/2022 Paulraj .................... H04B 17/11
2022/0366341 A1* 11/2022 Smotra ................. G06F 16/215

* cited by examiner

METHOD AND SYSTEM FOR RECURSIVE DATA REFINEMENT AND REPUBLISHING

CROSS-REFERENCE TO RELATED APPLICATIONS

This application claims the benefit of Indian Provisional Patent Application No. 202111024031, filed May 29, 2021, which is hereby incorporated by reference in its entirety. This application also claims the benefit of U.S. Provisional Patent Application Ser. No. 63/203,208, filed Jul. 13, 2021, which is hereby incorporated by reference in its entirety.

BACKGROUND

1. Field of the Disclosure

This technology generally relates to methods and systems for data refinement, and more particularly to methods and systems for facilitating recursive refinement of data in a data lake by progressively processing, republishing, and documenting the data.

2. Background Information

Many business entities utilize a networked repository such as, for example, a data lake environment to provide data such as, for example, real-time telemetry data for machine learning applications. Typically, the data in the data lake environment are processed and refined before use with the machine learning applications. Historically, conventional data processing and data refinement methods have resulted in varying degrees of success with respect to data usability, availability, and traceability.

One drawback of using conventional data processing and data refinement methods is that in many instances, the data processing and the data refinement methods are one-time processes that yield out of band artifacts which require deliberate effort to replay and reproduce. As a result, lineage of refined data in the data lake environment are not easily traced for replication. Additionally, since the conventional methods are one-time processes that only output the refined data, transitional data are not available for use at each stage in the refinement process.

Therefore, there is a need for a novel assembly of tools within the data lake environment to facilitate recursive refinement of data by progressively processing, republishing, and documenting the data for use in machine learning applications.

SUMMARY

The present disclosure, through one or more of its various aspects, embodiments, and/or specific features or sub-components, provides, inter alia, various systems, servers, devices, methods, media, programs, and platforms for facilitating recursive refinement of data in a data lake by progressively processing, republishing, and documenting the data.

According to an aspect of the present disclosure, a method for facilitating recursive data refinement and republishing is disclosed. The method is implemented by at least one processor. The method may include receiving, via a data ingestion component, raw data that is published from a networked repository; generating at least one conformed data set from the raw data based on at least one conformation parameter; retrieving, via a communication interface, at least one feature configuration; generating, in real-time, at least one featurized data set from the at least one conformed data set based on the at least one feature configuration; and publishing the at least one featurized data set, wherein the at least one featurized data set may be published to the data ingestion component for further processing.

In accordance with an exemplary embodiment, the method may further include receiving, via a graphical user interface, at least one predetermined condition, the at least one predetermined condition may relate to a qualifier for a user selected feature; determining whether the at least one featurized data set satisfies the at least one predetermined condition; and exposing, via an application programming interface, the at least one featurized data set when the at least one predetermined condition is satisfied.

In accordance with an exemplary embodiment, the at least one featurized data set may be published to the data ingestion component for further processing when the at least one predetermined condition is not satisfied.

In accordance with an exemplary embodiment, the at least one predetermined condition may relate to a feature condition that is automatically determined by a machine learning model based on at least one administrative requirement.

In accordance with an exemplary embodiment, the method may further include identifying at least one identifier that corresponds to the raw data; generating at least one document, the at least one document may include at least one from among data set information and data lineage information; and persisting the at least one document together with the at least one identifier in the networked repository.

In accordance with an exemplary embodiment, the data set information may relate to at least one from among the at least one conformed data set and the at least one featurized data set, and the data lineage information may relate to at least one from among origin information, movement information, characteristic information, and quality information that correspond to the raw data.

In accordance with an exemplary embodiment, the networked repository may include a data lake that persists at least one from among structured data, semi-structured data, unstructured data, and binary data.

In accordance with an exemplary embodiment, the raw data may include at least one from among reference data, event data, metric data, and log data.

In accordance with an exemplary embodiment, the at least one feature configuration may include at least one from among a feature selection configuration and a feature engineering configuration.

According to an aspect of the present disclosure, a computing device configured to implement an execution of a method for facilitating recursive data refinement and republishing is disclosed. The computing device including a processor; a memory; and a communication interface coupled to each of the processor and the memory, wherein the processor may be configured to receive, via a data ingestion component, raw data that is published from a networked repository; generate at least one conformed data set from the raw data based on at least one conformation parameter; retrieve, via a communication interface, at least one feature configuration; generate, in real-time, at least one featurized data set from the at least one conformed data set based on the at least one feature configuration; and publish the at least one featurized data set, wherein the at least one featurized data set may be published to the data ingestion component for further processing.

In accordance with an exemplary embodiment, the processor may be further configured to receive, via a graphical user interface, at least one predetermined condition, the at least one predetermined condition may relate to a qualifier for a user selected feature; determine whether the at least one featurized data set satisfies the at least one predetermined condition; and expose, via an application programming interface, the at least one featurized data set when the at least one predetermined condition is satisfied.

In accordance with an exemplary embodiment, the processor may be further configured to publish the at least one featurized data set to the data ingestion component for further processing when the at least one predetermined condition is not satisfied.

In accordance with an exemplary embodiment, the at least one predetermined condition may relate to a feature condition that is automatically determined by a machine learning model based on at least one administrative requirement.

In accordance with an exemplary embodiment, the processor may be further configured to identify at least one identifier that corresponds to the raw data; generate at least one document, the at least one document may include at least one from among data set information and data lineage information; and persist the at least one document together with the at least one identifier in the networked repository.

In accordance with an exemplary embodiment, the data set information may relate to at least one from among the at least one conformed data set and the at least one featurized data set, and wherein the data lineage information may relate to at least one from among origin information, movement information, characteristic information, and quality information that correspond to the raw data.

In accordance with an exemplary embodiment, the networked repository may include a data lake that persists at least one from among structured data, semi-structured data, unstructured data, and binary data.

In accordance with an exemplary embodiment, the raw data may correspond to real-time telemetry data, the raw data may include at least one from among reference data, event data, metric data, and log data.

In accordance with an exemplary embodiment, the at least one feature configuration may include at least one from among a feature selection configuration and a feature engineering configuration.

According to an aspect of the present disclosure, a non-transitory computer readable storage medium storing instructions for facilitating recursive data refinement and republishing is disclosed. The storage medium including executable code which, when executed by a processor, may cause the processor to receive, via a data ingestion component, raw data that is published from a networked repository; generate at least one conformed data set from the raw data based on at least one conformation parameter; retrieve, via a communication interface, at least one feature configuration; generate, in real-time, at least one featurized data set from the at least one conformed data set based on the at least one feature configuration; and publish the at least one featurized data set, wherein the at least one featurized data set may be published to the data ingestion component for further processing.

In accordance with an exemplary embodiment, when executed by the processor, the executable code may further cause the processor to receive, via a graphical user interface, at least one predetermined condition, the at least one predetermined condition may relate to a qualifier for a user selected feature; determine whether the at least one featurized data set satisfies the at least one predetermined condition; and expose, via an application programming interface, the at least one featurized data set when the at least one predetermined condition is satisfied.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
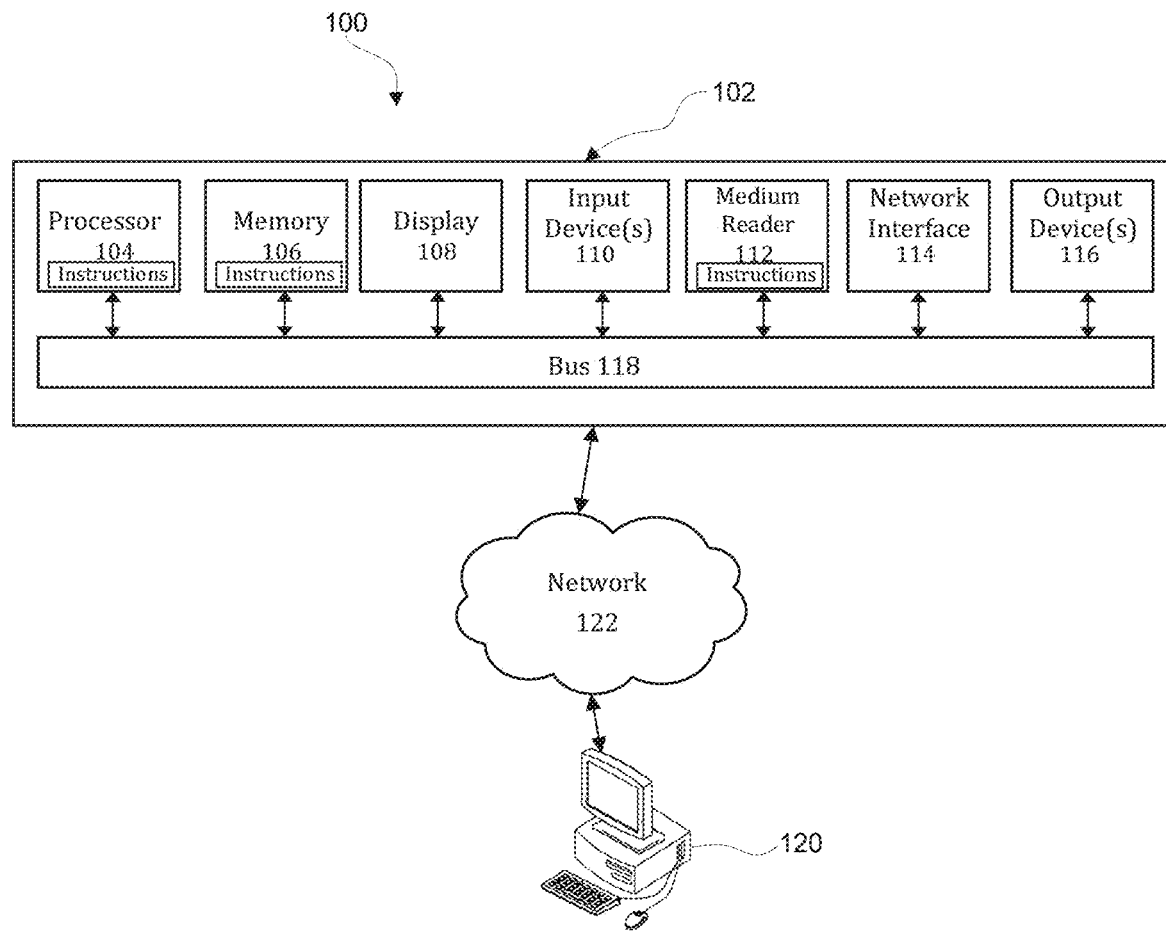
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating recursive refinement of data in a data lake by progressively processing, republishing, and documenting the data.

Figure 2:
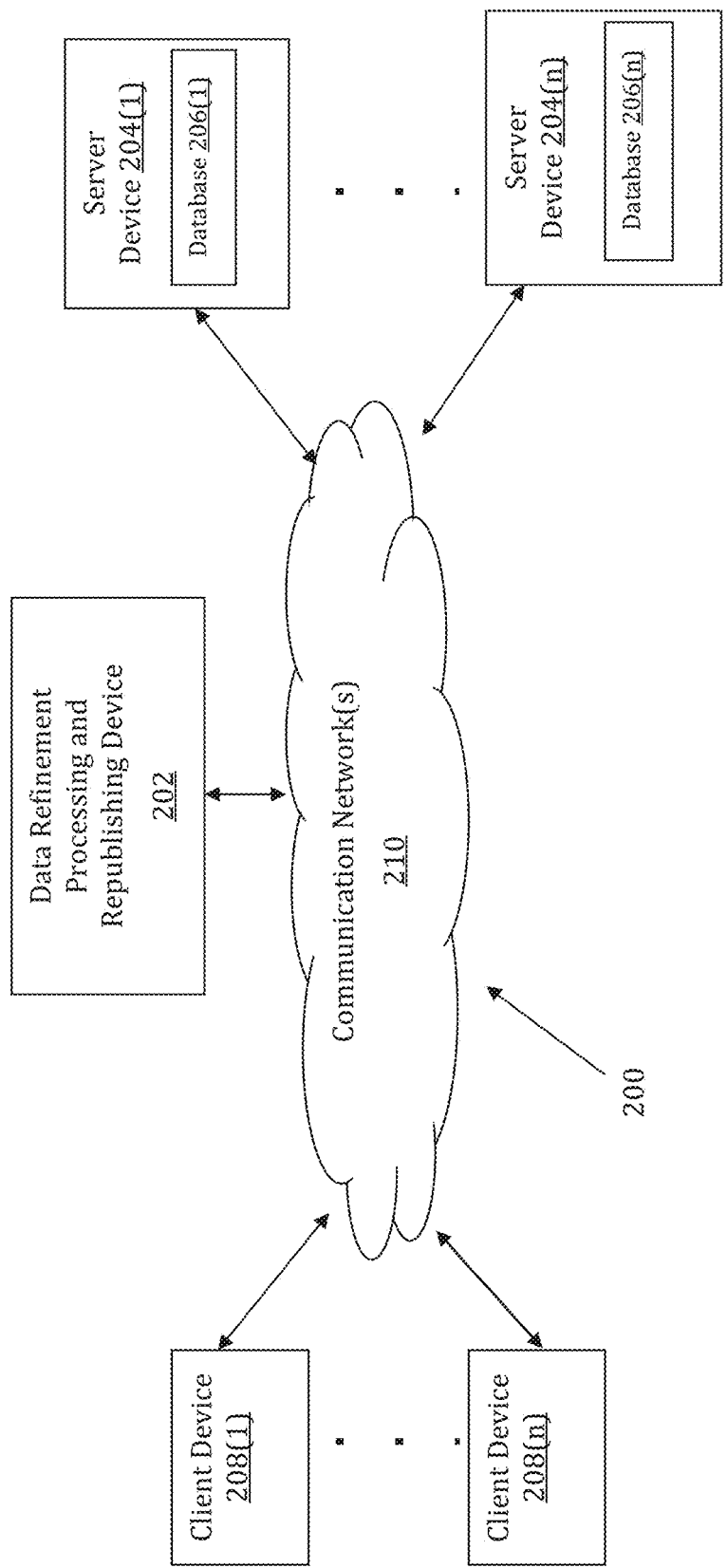
FIG. 2 illustrates an exemplary diagram of a network environment.

Referring to FIG. 2, a schematic of an exemplary network environment 200 for implementing a method for facilitating recursive refinement of data in a data lake by progressively processing, republishing, and documenting the data is illustrated. In an exemplary embodiment, the method is executable on any networked computer platform, such as, for example, a personal computer (PC).

The method for facilitating recursive refinement of data in a data lake by progressively processing, republishing, and documenting the data may be implemented by a Data Refinement Processing and Republishing (DRPR) device 202. The DRPR device 202 may be the same or similar to the computer system 102 as described with respect to FIG. 1. The DRPR device 202 may store one or more applications that can include executable instructions that, when executed by the DRPR device 202, cause the DRPR device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DRPR device 202 itself, may be located in virtual server(s) running in a cloud-based computing environment rather than being tied to one or more specific physical network computing devices. Also, the application(s) may be running in one or more virtual machines (VMs) executing on the DRPR device 202. Additionally, in one or more embodiments of this technology, virtual machine(s) running on the DRPR device 202 may be managed or supervised by a hypervisor.

In the network environment 200 of FIG. 2, the DRPR device 202 is coupled to a plurality of server devices 204(1)-204(n) that hosts a plurality of databases 206(1)-206(n), and also to a plurality of client devices 208(1)-208(n) via communication network(s) 210. A communication interface of the DRPR device 202, such as the network interface 114 of the computer system 102 of FIG. 1, operatively couples and communicates between the DRPR device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DRPR device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DRPR devices that efficiently implement a method for facilitating recursive refinement of data in a data lake by progressively processing, republishing, and documenting the data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DRPR device 202 may be a standalone device or integrated with one or more other devices or apparatuses, such as one or more of the server devices 204(1)-204(n), for example. In one particular example, the DRPR device 202 may include or be hosted by one of the server devices 204(1)-204(n), and other arrangements are also possible. Moreover, one or more of the devices of the DRPR device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DRPR device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to raw data, unstructured data, structured data, conformed data, feature data, telemetry data, reference data, event data, metric data, and log data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DRPR device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DRPR device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DRPR device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DRPR device 202, the server devices 204(1)-204(n), or the client devices 208(1)-208(n), for example, may be configured to operate as virtual instances on the same physical machine. In other words, one or more of the DRPR device 202, the server devices 204(1)-204(n), or the client devices 208(1)-208(n) may operate on the same physical device rather than as separate devices communicating through communication network(s) 210. Additionally, there may be more or fewer DRPR devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
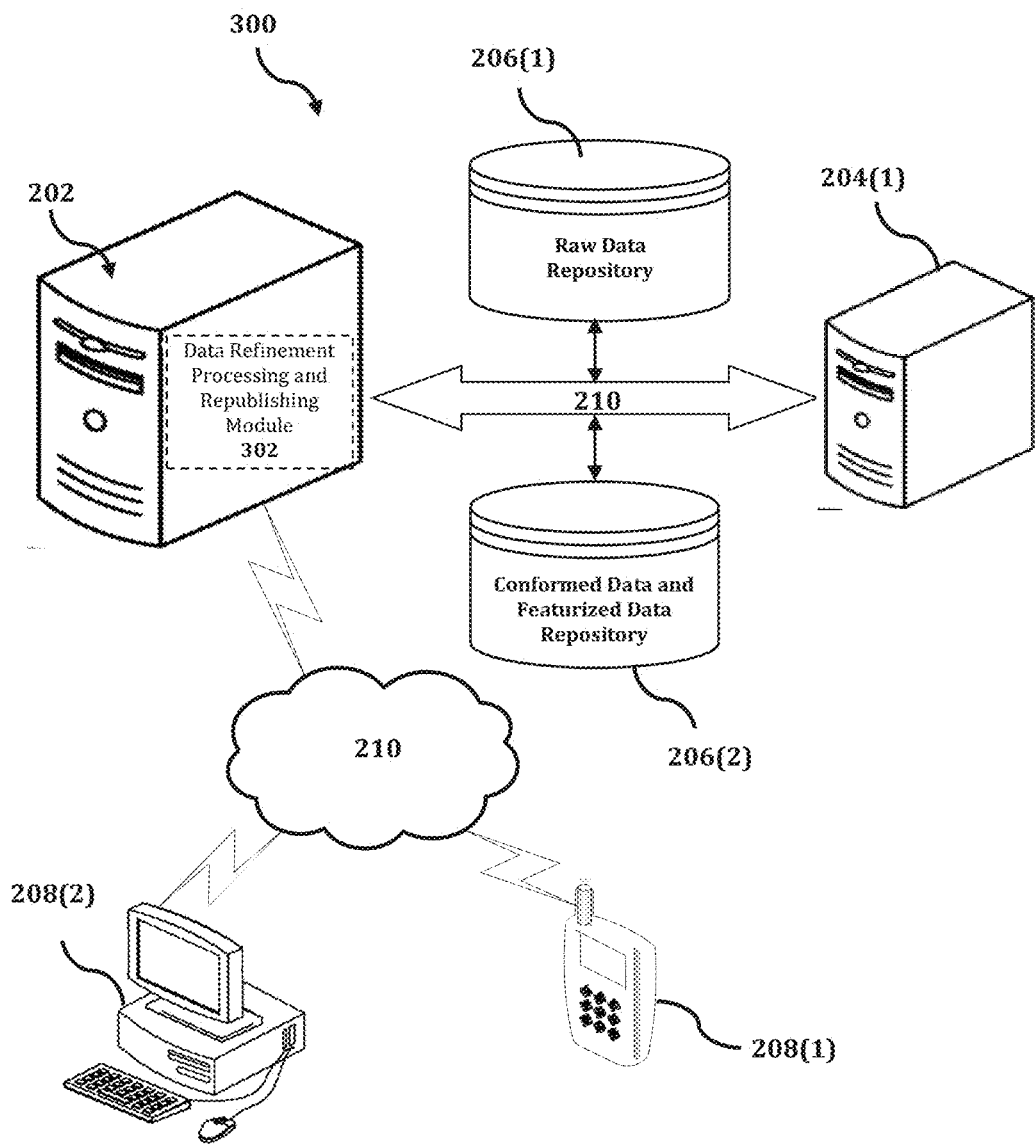
FIG. 3 shows an exemplary system for implementing a method for facilitating recursive refinement of data in a data lake by progressively processing, republishing, and documenting the data.

The DRPR device 202 is described and shown in FIG. 3 as including a data refinement processing and republishing module 302, although it may include other rules, policies, modules, databases, or applications, for example. As will be described below, the data refinement processing and republishing module 302 is configured to implement a method for facilitating recursive refinement of data in a data lake by progressively processing, republishing, and documenting the data.

An exemplary process 300 for implementing a mechanism for facilitating recursive refinement of data in a data lake by progressively processing, republishing, and documenting the data by utilizing the network environment of FIG. 2 is shown as being executed in FIG. 3. Specifically, a first client device 208(1) and a second client device 208(2) are illustrated as being in communication with DRPR device 202. In this regard, the first client device 208(1) and the second client device 208(2) may be "clients" of the DRPR device 202 and are described herein as such. Nevertheless, it is to be known and understood that the first client device 208(1) and/or the second client device 208(2) need not necessarily be "clients" of the DRPR device 202, or any entity described in association therewith herein. Any additional or alternative relationship may exist between either or both of the first client device 208(1) and the second client device 208(2) and the DRPR device 202, or no relationship may exist.

Further, DRPR device 202 is illustrated as being able to access a raw data repository 206(1) and a conformed data and featurized data repository 206(2). The data refinement processing and republishing module 302 may be configured to access these databases for implementing a method for facilitating recursive refinement of data in a data lake by progressively processing, republishing, and documenting the data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DRPR device 202 via broadband or cellular communication. Of course, these embodiments are merely exemplary and are not limiting or exhaustive.

Upon being started, the data refinement processing and republishing module 302 executes a process for facilitating recursive refinement of data in a data lake by progressively processing, republishing, and documenting the data. An exemplary process for facilitating recursive refinement of data in a data lake by progressively processing, republishing, and documenting the data is generally indicated at flowchart 400 in FIG. 4.

Figure 4:
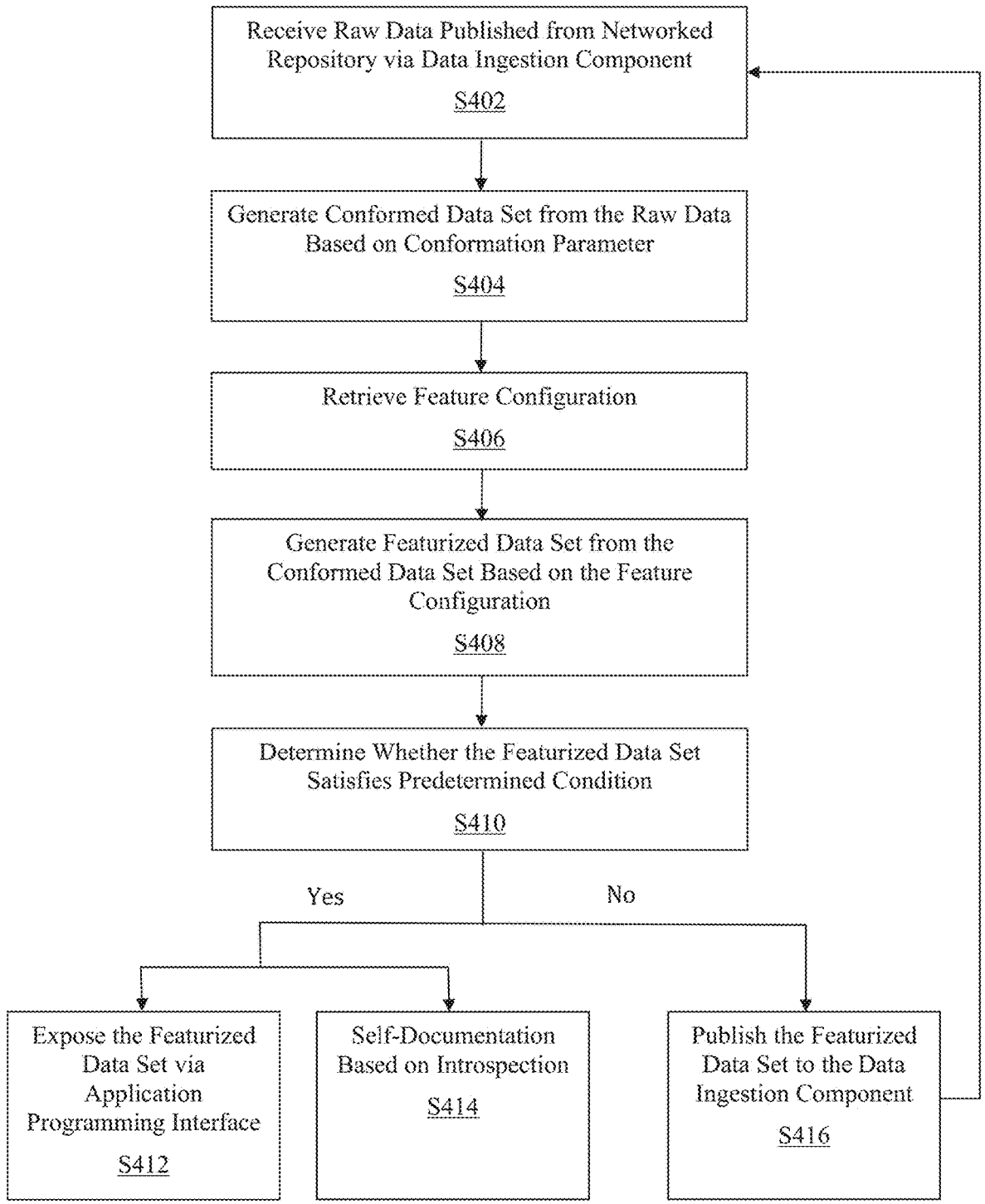
FIG. 4 is a flowchart of an exemplary process for implementing a method for facilitating recursive refinement of data in a data lake by progressively processing, republishing, and documenting the data.

In the process 400 of FIG. 4, at step S402, raw data that is published from a networked repository may be received via a data ingestion component. The raw data may include real-time telemetry data that is published from the networked repository. In an exemplary embodiment, the raw data may include at least one from among reference data, event data, metric data, and log data. The raw data may relate to time-series based numerical data.

In another exemplary embodiment, the raw data may include information in a multidimensional data structure. The multidimensional data structure may include comparison-based data structures such as, for example, a k-d trees structure, a quadtrees structure, and a range trees structure. In another exemplary embodiment, the multidimensional data structure may utilize a multidimensional data model to facilitate the storing of information. The multidimensional data model may be composed of at least one from among a logical cube, a measure, a dimension, a hierarchy, a level, and an attribute.

In another exemplary embodiment, the logical cube may enable the organizing of measures that have the same dimensions. Measures in the same cube may have the same relationships as other logical objects in the cube and may be analyzed and displayed together. In another exemplary embodiment, the measure may populate the cells of a logical cube with collected facts. Measures may be organized by dimensions such as, for example, a time dimension. In another exemplary embodiment, the dimension may contain a set of unique values that identify and categorize data. The dimensions may form the edges of the logical cube and in turn, form the edges of the measures within the cube.

In another exemplary embodiment, the hierarchy may include a method for organizing data at different levels of aggregation. Dimensional hierarchies may be utilized to recognize trends at a particular level as well as to identify a reason for the trends by examining lower levels that correspond to the particular level. In another exemplary embodiment, the level may represent a position in the hierarchy. Each of the levels may contain aggregate values for the levels below it. In another exemplary embodiment, the attribute may provide additional information about the stored data. Attributes such as, for example, the time attribute may provide information about the time dimension to identify the last day in each time period.

In another exemplary embodiment, the networked repository may include a centralized repository such as, for example, a data lake that enables the persisting of structured and unstructured data at any scale. The data lake may persist at least one from among structured data, semi-structured data, unstructured data, and binary data. In another exemplary embodiment, the centralized repository may persist data as-is, without having to first structure the data, as well as run different types of analytics such as, for example, a dashboard analytic, a visualization analytic, a big data processing analytic, a real-time analytic, and a machine learning analytic. In another exemplary embodiment, the networked repository may include a curated repository such as, for example, a data reservoir that enables the persisting of structured data.

At step S404, a conformed data set may be generated from the raw data based on a conformation parameter. In an exemplary embodiment, the conformation parameter may be received as a user input via a graphical user interface. For example, a user may predesignate requirements by submitting an input via the graphical user interface for the transformation of the raw data into a data set in an expected format. In another exemplary embodiment, the conformation parameter may be an automatic configuration that has been predetermined based on enterprise network data requirements. For example, an organization may predesignate a standardized data format that must be used by data consumers in the enterprise network system. As will be appreciated by a person of ordinary skill in the art, users and consumers of data in the enterprise network may include human users as well as at least one from among a monolithic application and a microservice application.

In another exemplary embodiment, the raw data may first be mapped to a predetermined file format based on the conformation parameter. Mapping of the raw data may include a process of creating data element mappings between two distinct data models. The data set may be mapped by using a methodology such as, for example, hand-coded mapping, data driven mapping, and semantic mapping. In another exemplary embodiment, the predetermined file format may include at least one from among an open standard file format and a data interchange file format that uses human-readable text to store and transmit data objects. For example, the predetermined file format may include a JavaScript Object Notation (JSON) file format that consists of serializable values such as attribute-value pairs and array data types.

In another exemplary embodiment, a standardized data set may be generated based on a result of the mapping. The standardized data set may correspond to the predetermined file format. In an exemplary embodiment, the standardized data set may include a structured set of data in the predetermined file format. For example, the standardized data set may include data that has been structured into the JSON file format based on the mapping. As will be appreciated by a person of ordinary skill in the art, the result of the mapping may be used to structure data in the data set based on requirements of the predetermined file format. Then, the conformed data set may be generated from the standardized data set based on the conformation parameter.

At step S406, a feature configuration may be retrieved via a communication interface. The feature configuration may correspond to at least one from among a feature selection configuration and a feature engineering configuration. In an exemplary embodiment, the feature selection configuration may correspond to a process such as, for example, a variable selection process, an attribute selection process, and a variable subset selection process for selecting a subset of relevant features for use in machine learning model construction. The feature selection configuration may be used to guide the removal of redundant and/or irrelevant data. In another exemplary embodiment, the feature selection configuration may include an algorithm that is the combination of a search technique for proposing new feature subsets and an evaluation measure which scores the different feature subsets.

In another exemplary embodiment, the feature engineering configuration may correspond to a process for using domain knowledge to extract features from the raw data via data mining techniques. The data mining techniques may include processes such as, for example, a classification process, a clustering process, a regression process, an association rules process, an outer detection process, a sequential patterns process, and a prediction process for extracting and discovering patterns in large data sets. In another exemplary embodiment, the feature engineering configuration may relate to an automated process for identifying and extracting features from the raw data. As will be appreciated by a person of ordinary skill in the art, the feature engineering configuration may include a machine learning process to extract features from the raw data.

At step S408, a featurized data set may be generated in real-time from the conformed data set based on the feature configuration. The featurized data set may relate to a processed data set and corresponding metadata that results once feature conditions are applied to raw and/or conformed data. In an exemplary embodiment, the featurized data set may include an individual measurable property and/or characteristic such as, for example, a feature of an observed pattern. The feature may include informative features, discriminating features, and independent features. In another exemplary embodiment, the feature may include numerical components as well as structural components such as, for example, a string component and a graph component. A set of numeric feature values may be described by a feature vector. As will be appreciated by a person of ordinary skill in the art, the feature may be utilized in pattern recognition, pattern classification, and pattern regression that correspond to statistical analysis techniques such as, for example, a machine learning technique.

At step S410, a determination may be made as to whether the featurized data set satisfies a predetermined condition. The predetermined condition may relate to a condition of a feature such as, for example, a satisfactory condition. In an exemplary embodiment, the predetermined condition may be received as a user input via a graphical user interface. For example, a user may predesignate a feature condition by submitting an input via the graphical user interface for the featurized data set.

In another exemplary embodiment, the predetermined condition may be an automatic feature condition that has been predetermined based on administrative requirements. The feature condition may correspond to any code and/or instruction that provide guidelines on how the data element must be transformed. The feature condition may include at least one from among a scaling condition, an encoding condition, and an embedding condition. For example, an administrator may predesignate a satisfactory feature condition that must be satisfied before the featurized data set may be consumed. As will be appreciated by a person of ordinary skill in the art, users and consumers of the featurized data set in the enterprise network may include human users as well as at least one from among a monolithic application and a microservice application.

At step S412, when the predetermined condition is satisfied, the featurized data set may be exposed via an application programming interface (API). In an exemplary embodiment, the API may correspond to a software intermediary that allows at least two applications to communicate with each other. The API may facilitate interactions between multiple software applications by defining parameters such as, for example, the kind of calls and/or requests that can be made, how the calls and/or requests are made, the data formats that should be used, and the conventions that must be followed. In another exemplary embodiment, the API may include a representational state transfer (REST) API that conforms to a software architectural style that uses a subset of hypertext transfer protocol (HTTP). As will be appreciated by a person of ordinary skill in the art, the exposed featurized data set may be consumed by a prediction runtime via the API.

At step S414, documentation may be automatically generated for the featurized data set when the predetermined condition is satisfied. The automatically generated documentation may be based on introspection of each processing step consistent with present disclosures that resulted in satisfaction of the predetermined condition. In another exemplary embodiment, the documentation may relate to a record such as, for example, a log of metadata that corresponds to the featurized data set. The documentation may include processing artifacts that corresponds to the featurized data set. In another exemplary embodiment, the documentation may electronically capture metadata that would otherwise be out of band artifacts.

At step S416, when the predetermined condition is not satisfied, the featurized data set is published to the data ingestion component for further processing. In an exemplary embodiment, a real-time feature transformation runtime may be used to facilitate the transformation of the featurized data set. The real-time feature transformation runtime may facilitate the publishing of the featurized data set to the data ingestion component for further processing when the predetermined condition is not satisfied. In another exemplary embodiment, the real-time feature transformation runtime may correspond to a runtime environment that implements an execution model. For example, the runtime environment may relate to the environment in which a program and/or application is executed. The runtime environment may include hardware and software infrastructure that supports the running of a particular codebase in real time.

In another exemplary embodiment, the predetermined condition may be received via a graphical user interface. The predetermined condition may relate to a qualifier for a user selected feature. Then, a determination may be made as to whether the featurized data set satisfies the predetermined condition. The featurized data set may be exposed via the application programming interface when the predetermined condition is satisfied.

In another exemplary embodiment, an identifier that corresponds to the raw data may be identified. A document that includes at least one from among data set information and data lineage information may be generated. In another exemplary embodiment, the data set information may relate to at least one from among the conformed data set and the featurized data set. Likewise, the data lineage information may relate to at least one from among origin information, movement information, characteristic information, and quality information that correspond to the raw data. Then, the document may be persisted together with the identifier in the networked repository. In another exemplary embodiment, the documenting of the data set information and the data lineage information may be accomplished automatically each time the raw data is conformed and featurized.

Figure 5:
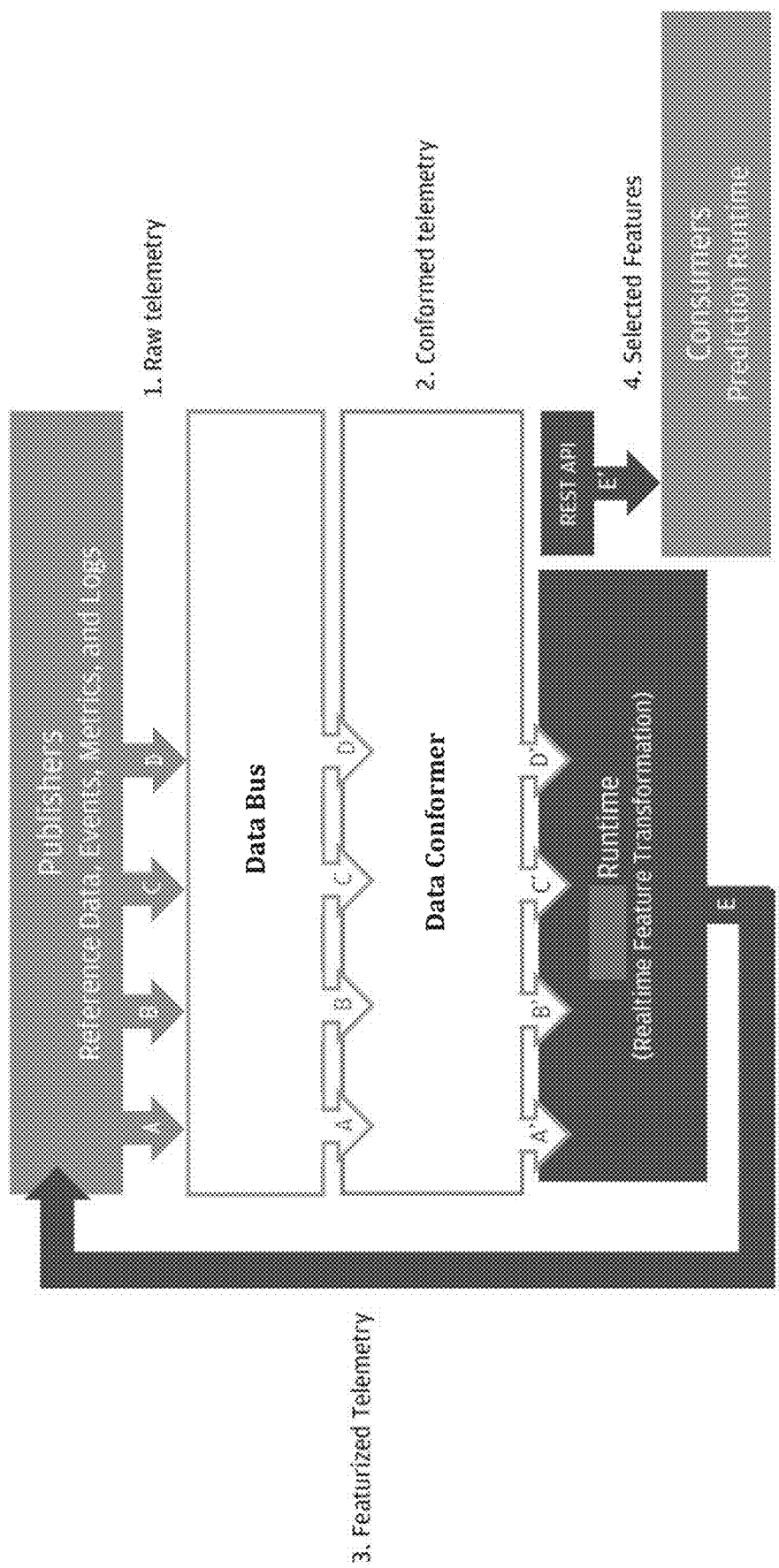
FIG. 5 is a production environment diagram that illustrates a runtime that is usable for implementing a method for facilitating recursive refinement of data in a data lake by progressively processing, republishing, and documenting the data, according to an exemplary embodiment.

FIG. 5 is a production environment diagram 500 that illustrates a runtime that is usable for implementing a method for facilitating recursive refinement of data in a data lake by progressively processing, republishing, and documenting the data, according to an exemplary embodiment. In FIG. 5, various components such as, for example, a data publisher, a data bus, a data conformer, an application programming interface (API), a consumer, and a real-time feature transformation runtime are presented in a specified configuration to implement a method for facilitating recursive refinement of data in a data lake by progressively processing, republishing, and documenting the data.

As illustrated in FIG. 5, at step 1, raw telemetry data may be received from the data publisher. The data publisher may publish raw telemetry data that relates to at least one from among reference data, event data, metric data, and log data. The raw telemetry data may be received by the data bus and passed to the data conformer for processing. At step 2, the data conformer may process the raw telemetry data to conform the raw telemetry data to a predetermined format. The data conformer may output standardized data in the predetermined format that corresponds to the raw telemetry data.

Then, at step 3, the standardized data may be fed into a runtime environment such as, for example, the real-time feature transformation runtime. The real-time feature transformation runtime may transform the standardized data to generate machine learning feature data based on predetermined configurations. The feature may include an individual measurable property and/or characteristic of an observed phenomenon. The real-time feature transformation runtime may also determine whether predetermined conditions are satisfied. When the predetermined conditions are not satisfied, the real-time feature transformation runtime may publish the feature data back to the data bus for additional processing. When the predetermined conditions are satisfied, the real-time feature transformation runtime may expose the feature data at step 4.

At step 4, the real-time feature transformation runtime may expose the feature data that satisfies the predetermined condition for consumption by prediction runtime environments. The feature data may be exposed via a representational state transfer (REST) API. In another exemplary embodiment, the real-time feature transformation runtime may also document the transformation process of the raw telemetry data to generate corresponding data lineage documentation. The generated data lineage documentation may facilitate traceability and reproducibility of the raw telemetry data.

Figure 6:
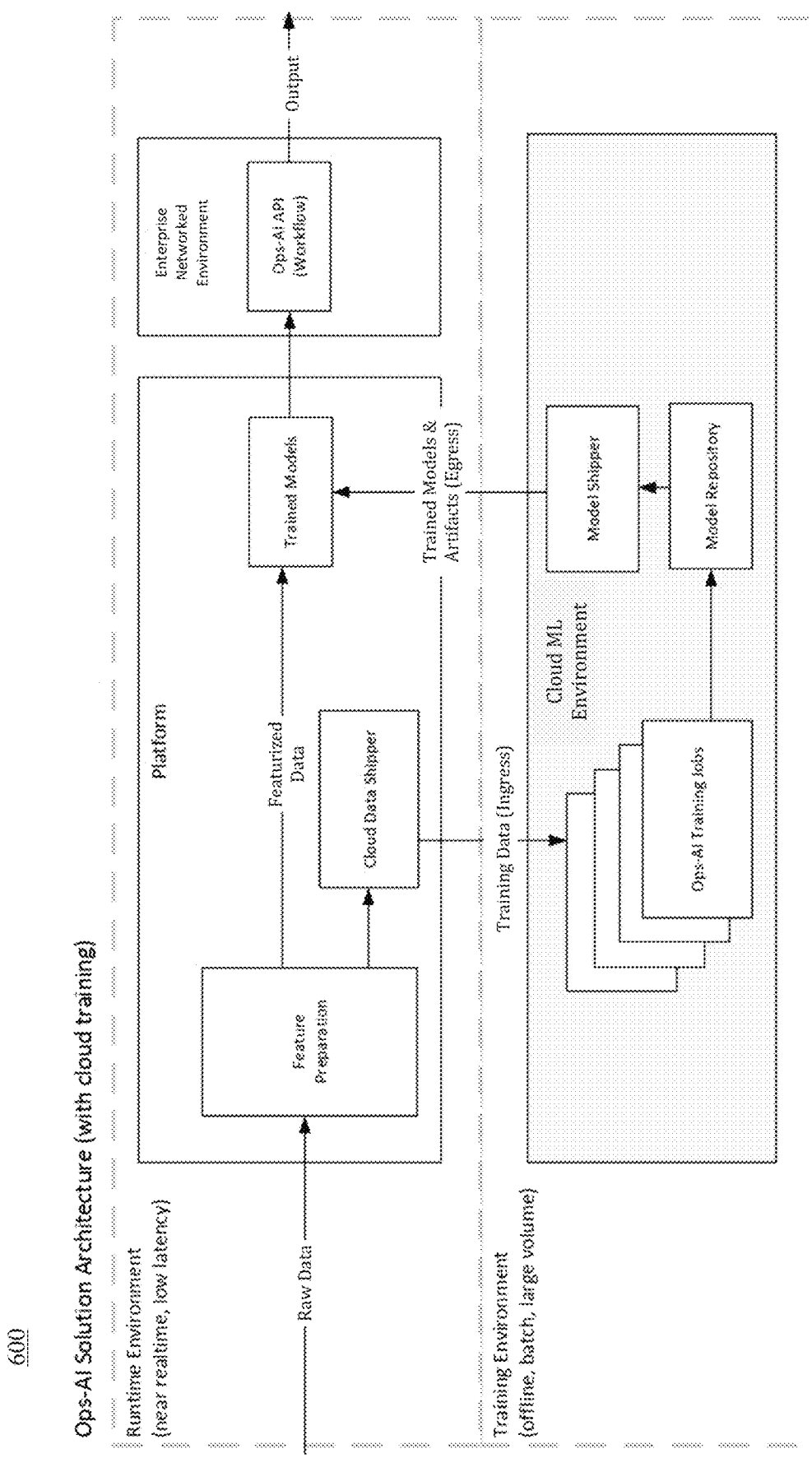
FIG. 6 is a diagram that illustrates an artificial intelligence architecture that is usable for implementing a method for facilitating recursive refinement of data in a data lake by progressively processing, republishing, and documenting the data, according to an exemplary embodiment.

FIG. 6 is a diagram 600 that illustrates an artificial intelligence architecture that is usable for implementing a method for facilitating recursive refinement of data in a data lake by progressively processing, republishing, and documenting the data, according to an exemplary embodiment. FIG. 6 provides an exemplary use case for an operations architecture that utilizes artificial intelligence for network fault detection in a predictive runtime environment.

As illustrated in FIG. 6, a runtime environment may operate together with a training environment. The runtime environment may facilitate real-time, low latency processing of raw data. The raw data may be ingested by a feature preparation component which transforms the data into featurized data. The featurized data may then be fed into trained models to generate a predictive output that may be exposed for consumption via an application programing interface (API). The feature preparation component may also utilize a cloud data shipper component to feed the featurized data to the training environment for use as training data.

The training environment may facilitate offline, batch processing of large volumes of data. In the training environment, a training jobs component may receive the training data from the cloud data shipper component in the runtime environment. A model repository in the training environment may retrieve the training data from the training jobs component to train a plurality of machine learning models. The trained machine learning models and corresponding artifacts may then be provided to the runtime environment via a model shipper component of the training environment.

Figure 7:
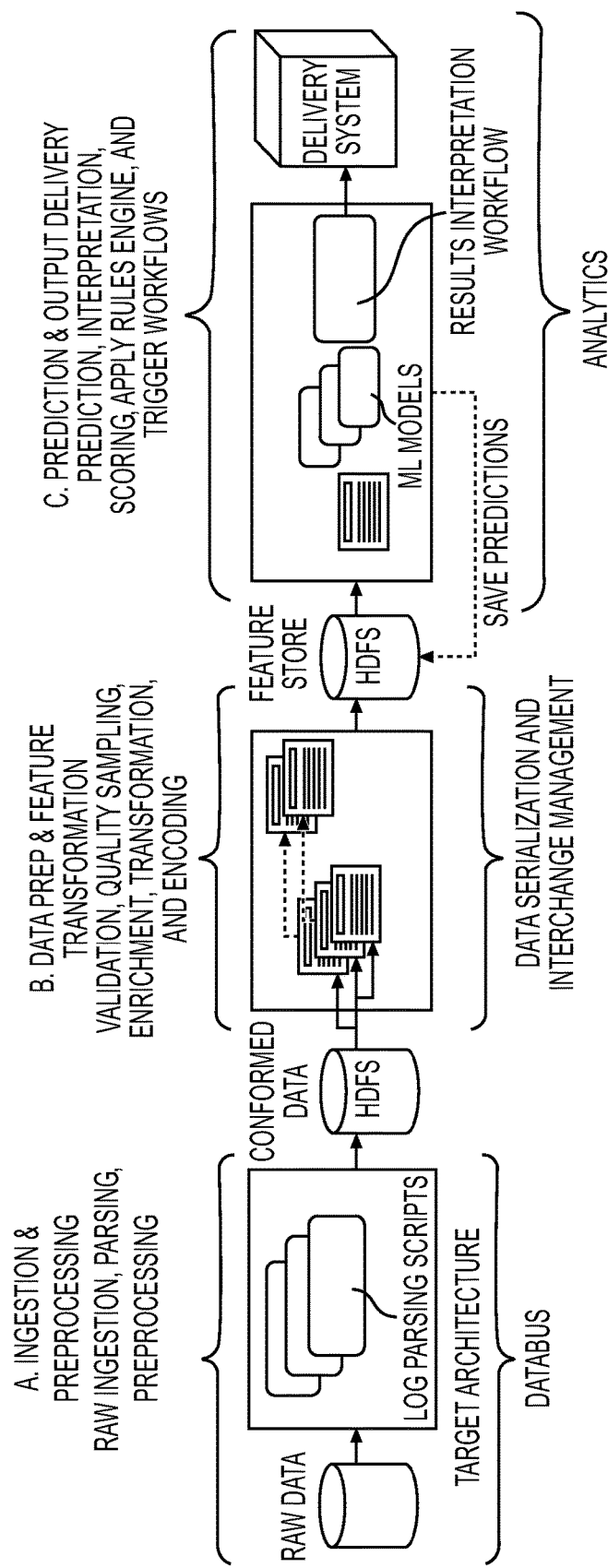
FIG. 7 is a diagram that illustrates an integrated architecture that is usable for implementing a method for facilitating recursive refinement of data in a data lake by progressively processing, republishing, and documenting the data, according to an exemplary embodiment.

FIG. 7 is a diagram 700 that illustrates an integrated architecture that is usable for implementing a method for facilitating recursive refinement of data in a data lake by progressively processing, republishing, and documenting the data, according to an exemplary embodiment. FIG. 7 provides a simplified view of a common architecture pattern that is usable to implement the disclosed invention.

As illustrated in FIG. 7, the architecture is comprised of processing stages that includes an ingestion and preprocessing stage, a data preparation and feature transformation stage, as well as a prediction and output delivery stage. In the ingestion and preprocessing stage, the raw data may be ingested, parsed, and preprocessed based on a predetermined configuration. Log parsing and ingestion may be ported to a component within the data bus while preprocessed topics are available for persisting.

In the data preparation and feature transformation stage, the preprocessed data may be validated, sampled for quality, enriched, further transformed, and encoded for storage in a feature store. The preprocessed and conformed data may be available for easy access via a data API. Industrialized and scheduled processing environments may be provided to perform enrichment and feature transformation. The industrialized and scheduled processing environments may enable the saving of transformed features via an abstracted feature store by leveraging integrated republishing mechanisms.

In the prediction and output delivery stage, prediction techniques and rules may be applied to the data to interpret, score, and trigger workflows that rely on the processed data. The prediction pipeline may be hosted in an enterprise analytics platform. The enterprise analytics platform may initiate a runtime to access and retrieve prepared features as well as encoded lookups to run prediction models and store prediction outputs for later use. Results interpretation and resulting workflows such as, for example, generating and sending email alerts may be hosted and triggered within the prediction and output delivery stage.

Accordingly, with this technology, an optimized process for facilitating recursive refinement of data in a data lake by progressively processing, republishing, and documenting the data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating recursive data refinement and republishing, the method being implemented by at least one processor, the method comprising:
   receiving, by the at least one processor via a data ingestion component, raw data that is published from a networked repository,
      wherein the raw data includes time-series based numerical data in a multidimensional data structure;
   generating, by the at least one processor, at least one conformed data set from the raw data based on at least one conformation parameter by,
      mapping, by the at least one processor, the raw data to a predetermined file format;
      generating, by the at least one processor, at least one data element map between a first data model that is associated with the raw data and a second data model that is associated with the predetermined file format;

structuring, by the at least one processor, at least one standardized data set by using the raw data according to the at least one data element map; and generating, by the at least one processor, the at least one conformed data set from the at least one standardized data set based on the at least one conformation parameter;

retrieving, by the at least one processor via a communication interface, at least one feature configuration;

generating, by the at least one processor in real-time, at least one featurized data set from the at least one conformed data set based on the at least one feature configuration, wherein the at least one featurized data set includes a first featurized data set and a second featurized data set;

wherein each of the at least one featurized data set includes an individual measurable property and a characteristic of an observed pattern; and publishing, by the at least one processor, the at least one featurized data set, wherein only the second featurized data set of the at least one featurized data set among the first featurized data set and the second featurized data set is published to the data ingestion component for further processing;

determining, by the at least one processor, whether the at least one featurized data set satisfies at least one predetermined condition;

in response to determining that the first featurized data set of the at least one featurized data set satisfies the at least one predetermined condition:

providing the at least one featurized data set to one or more machine learning (ML) models for performing a prediction and generating a prediction output;

outputting, by the one or more ML models and to a feature data store, the prediction output;

storing, by the feature data store, the prediction output as a feature to be included in a subsequent featurized data set; and automatically generating at least one document including a log of metadata that corresponds to the featurized data set, the log of metadata including data lineage information indicating at least one of origin information, movement information, characteristic information and quality information that correspond to the raw data published from the networked repository, wherein the at least one document including the data lineage information is configured to facilitate traceability and reproducibility of transformations of the raw data that is published from the networked repository; and in response to determining that the second featurized data set of the at least one featurized data set satisfies the at least one predetermined condition:

publishing, while bypassing feeding the second featurized data set to the one or more ML models, the second featurized data set to the data ingestion component to be processed along with subsequent raw data for generating a subsequent featurized data set.

2. The method of claim 1, wherein the at least one predetermined condition is received via a graphical user interface, wherein the at least one predetermined condition relating to a qualifier for a user selected feature, and wherein the method further comprises exposing, by the at least one processor via an application programming interface, the at least one featurized data set when the at least one predetermined condition is satisfied.

3. The method of claim 1, wherein the at least one predetermined condition relates to a feature condition that is automatically determined by the one or more ML models based on at least one administrative requirement.

4. The method of claim 1, further comprising:

identifying, by the at least one processor, at least one identifier that corresponds to the raw data; and persisting, by the at least one processor, the at least one document together with the at least one identifier in the networked repository.

5. The method of claim 4, wherein the at least one document further includes data set information, and wherein the data set information relates to at least one from among the at least one conformed data set and the at least one featurized data set.

6. The method of claim 1, wherein the networked repository includes a data lake that persists at least one from among structured data, semi-structured data, unstructured data, and binary data.

7. The method of claim 1, wherein the raw data corresponds to real-time telemetry data, the raw data including at least one from among reference data, event data, metric data, and log data.

8. The method of claim 1, wherein the at least one feature configuration includes at least one from among a feature selection configuration and a feature engineering configuration.

9. A computing device configured to implement an execution of a method for facilitating recursive data refinement and republishing, the computing device comprising:

a processor;

a memory; and a communication interface coupled to each of the processor and the memory, wherein the processor is configured to:

receive, via a data ingestion component, raw data that is published from a networked repository, wherein the raw data includes time-series based numerical data in a multidimensional data structure;

generate at least one conformed data set from the raw data based on at least one conformation parameter by further configuring the processor to:

map the raw data to a predetermined file format;

generate at least one data element map between a first data model that is associated with the raw data and a second data model that is associated with the predetermined file format;

structure at least one standardized data set by using the raw data according to the at least one data element map; and generate the at least one conformed data set from the at least one standardized data set based on the at least one conformation parameter;

retrieve, via a communication interface, at least one feature configuration;

generate, in real-time, at least one featurized data set from the at least one conformed data set based on the at least one feature configuration, wherein the at least one featurized data set includes a first featurized data set and a second featurized data set;

wherein each of the at least one featurized data set includes an individual measurable property and a characteristic of an observed pattern; and publish the at least one featurized data set,
wherein only the second featurized data set of the at least one featurized data set among the first featurized data set and the second featurized data set is published to the data ingestion component for further processing;

determine whether the at least one featurized data set satisfies at least one predetermined condition;

in response to a determination that the first featurized data set of the at least one featurized data set satisfies the at least one predetermined condition:

provide the at least one featurized data set to one or more machine learning (ML) models for performing a prediction and generating a prediction output;

output, via the one or more ML models and to a feature data store, the prediction output;

store, via the feature data store, the prediction output as a feature to be included in a subsequent featurized data set; and automatically generate at least one document including a log of metadata that corresponds to the featurized data set, the log of metadata including data lineage information indicating at least one of origin information, movement information, characteristic information and quality information that correspond to the raw data published from the networked repository, wherein the at least one document including the data lineage information is configured to facilitate traceability and reproducibility of transformations of the raw data that is published from the networked repository; and in response to a determination that the second featurized data set of the at least one featurized data set satisfies the at least one predetermined condition:

publish, while bypassing feeding the second featurized data set to the one or more ML models, the second featurized data set to the data ingestion component to be processed along with subsequent raw data for generating a subsequent featurized data set.

10. The computing device of claim 9, wherein the at least one predetermined condition is received via a graphical user interface, wherein the at least one predetermined condition relating to a qualifier for a user selected feature, and wherein the processor is further configured to expose, via an application programming interface, the at least one featurized data set when the at least one predetermined condition is satisfied.

11. The computing device of claim 9, wherein the at least one predetermined condition relates to a feature condition that is automatically determined by the one or more ML models based on at least one administrative requirement.

12. The computing device of claim 9, wherein the processor is further configured to:

identify at least one identifier that corresponds to the raw data; and persist the at least one document together with the at least one identifier in the networked repository.

13. The computing device of claim 12,
wherein the at least one document further includes data set information, and wherein the data set information relates to at least one from among the at least one conformed data set and the at least one featurized data set.

14. The computing device of claim 9, wherein the networked repository includes a data lake that persists at least one from among structured data, semi-structured data, unstructured data, and binary data.

15. The computing device of claim 9, wherein the raw data corresponds to real-time telemetry data, the raw data including at least one from among reference data, event data, metric data, and log data.

16. The computing device of claim 9, wherein the at least one feature configuration includes at least one from among a feature selection configuration and a feature engineering configuration.

17. A non-transitory computer readable storage medium storing instructions for facilitating recursive data refinement and republishing, the storage medium comprising executable code which, when executed by a processor, causes the processor to:

receive, via a data ingestion component, raw data that is published from a networked repository,
wherein the raw data includes time-series based numerical data in a multidimensional data structure;

generate at least one conformed data set from the raw data based on at least one conformation parameter by further causing the processor to:

map the raw data to a predetermined file format;

generate at least one data element map between a first data model that is associated with the raw data and a second data model that is associated with the predetermined file format;

structure at least one standardized data set by using the raw data according to the at least one data element map; and generate the at least one conformed data set from the at least one standardized data set based on the at least one conformation parameter;

retrieve, via a communication interface, at least one feature configuration;

generate, in real-time, at least one featurized data set from the at least one conformed data set based on the at least one feature configuration,
wherein the at least one featurized data set includes a first featurized data set and a second featurized data set;

wherein each of the at least one featurized data set includes an individual measurable property and a characteristic of an observed pattern; and publish the at least one featurized data set,
wherein only the second featurized data set of the at least one featurized data set among the first featurized data set and the second featurized data set is published to the data ingestion component for further processing;

determine whether the at least one featurized data set satisfies at least one predetermined condition;

in response to a determination that the first featurized data set of the at least one featurized data set satisfies the at least one predetermined condition:

provide the at least one featurized data set to one or more machine learning (ML) models for performing a prediction and generating a prediction output;

output, via the one or more ML models and to a feature data store, the prediction output;

store, via the feature data store, the prediction output as a feature to be included in a subsequent featurized data set; and automatically generate at least one document including a log of metadata that corresponds to the featurized data set, the log of metadata including data lineage information indicating at least one of origin information, movement information, characteristic information and quality information that correspond to the raw data published from the networked repository, wherein the at least one document including the data lineage information is configured to facilitate traceability and reproducibility of transformations of the raw data that is published from the networked repository; and in response to determining that the second featurized data set of the at least one featurized data set satisfies the at least one predetermined condition:

publish, while bypassing feeding the second featurized data set to the one or more ML models, the second featurized data set to the data ingestion component to be processed along with subsequent raw data for generating a subsequent featurized data set.

18. The storage medium of claim 17, wherein the at least one predetermined condition is received via a graphical user interface, wherein the at least one predetermined condition relating to a qualifier for a user selected feature, and wherein, when executed by the processor, the executable code further causes the processor to expose, via an application programming interface, the at least one featurized data set when the at least one predetermined condition is satisfied.

* * * * *